3,770,800
TEREPHTHALONITRILE PURIFICATION PROCESS
Richard V. Norton, Wilmington, Del., assignor to Sun Research and Development Co., Philadelphia, Pa.
Filed Feb. 22, 1972, Ser. No. 228,160
Int. Cl. C07c *121/52, 121/58*
U.S. Cl. 260—465 C      4 Claims

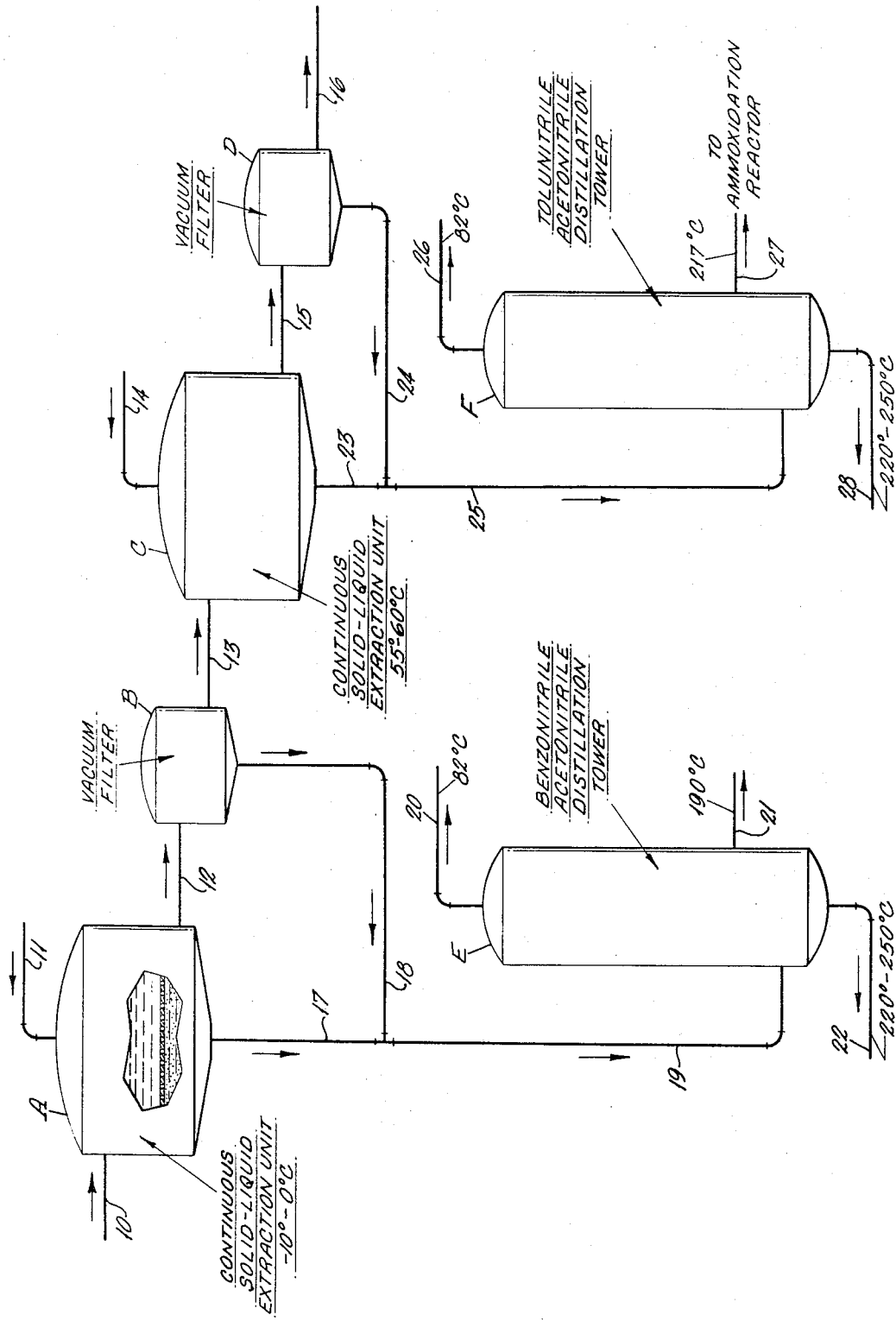

ABSTRACT OF THE DISCLOSURE

A process for the separation of benzonitrile and p-toluonitrile from admixture with terephthalonitrile by subjecting said mixture to extraction with acetonitrile, first at a temperature from about −20° C. to about 10° C. whereby benzonitrile is removed, and then to a second extraction at a temperature from about 30° C. to about 80° C. whereby p-toluonitrile is removed.

---

Terephthalonitrile is an intermediate to terephthalic acid which is an important chemical of commerce in its use for the preparation of polyethyleneterephthalate fibers. Terephthalonitrile may be prepared by the vapor phase ammoxidation of p-xylene and when so prepared contains p-toluonitrile as a major impurity and benzonitrile in minor amounts. Both of these impurities must be removed prior to the conversion of the nitrile to terephthalic acid.

In the usual practice heretofore as disclosed by U.S. Pat. 2,846,462 (Hadley, D. S. assigned to Distillers Co., Ltd., issued Aug. 5, 1958) the gases from the ammoxidation reactor are cooled to deposit the mixture of nitriles as a solid and the toluonitriles are removed by extraction with paraffinic solvents such as petroleum ether, or alternatively, the mixture is purified by distillation methods. It has now been found, however, that a very simple extraction process with acetonitrile operated over two distinct temperature ranges provides a highly efficient process for purification of terephthalonitrile whereby both benzonitrile and p-toluonitrile impurities are removed.

In accord with the invention, benzonitrile and p-toluonitrile are separated from admixture with terephthalonitrile by subjecting said mixture to extraction with acetonitrile, first at a temperature of from about −20° C. to about 10° C. to remove benzonitrile, and then at a temperature of from about 30° C. to about 80° C. to remove p-toluonitrile.

Another object of the invention is to provide a continuous process whereby the extractant acetonitrile and recovered p-toluonitrile is recycled thereby providing a highly efficient low cost operation.

In carrying out the process of the invention, the terephthalonitrile, which is solid under the extraction conditions, is simply mixed thoroughly with the liquid acetonitrile at the desired treatment temperature and the mass filtered. Generally, for each extraction, the weight ratio of liquid acetonitrile to terephthalonitrile will be from about 2:1 to about 15:1, the preferred ratio being about 3:1. However, the amount of acetonitrile used is in no way critical to the process; the amount to be used will simply be sufficient to effect suitable extraction of the benzonitrile or p-toluonitrile. It will also be understood that the process is readily carried out in conventional extractions, is simply mixed thoroughly with the liquid acetozonitrile extraction step of the process the preferred temperature will be in the range of about 0° to about 5° C. and for the p-toluonitrile extraction the preferred temperature will be from about 50° to about 60° C.

Another embodiment of the invention includes a continuous process in that after each of the extraction steps the acetonitrile extractant is distilled off and recycled for reuse. Likewise, the p-toluonitrile extracted in the second step may be separated from the acetonitrile and recycled to the ammoxidation unit for conversion to terephthalonitrile. It will, of course, be understood that should color bodies form and/or build up during recycle, they are readily removed by treatment of the liquid with activated charcoal.

This invention will be of greatest value in separating the products from ammoxidation with a non-selective catalyst; e.g., the product composition may contain as much as 60% p-toluonitrile and up to about 10% benzonitrile. However, the process is of significant value with ammoxidation product mixtures containing 20% p-toluonitrile and less than 0.1% benzonitrile, which together with 80% terephthalonitrile is the product from a selective ammoxidation. Preferably, for use in the process of the invention, an ammoxidation product will be used which contains from about 20% to about 50% p-toluonitrile, from about 0.01 to about 3% benzonitrile, and the balance being terephthalonitrile.

In order to further illustrate the invention, the following examples are given:

EXAMPLES 1 TO 5

Terephthalonitrile (TPN) containing various amounts of benzonitrile (BN) and p-toluonitrile (TN) are extracted with acetonitrile at various temperatures in accord with the invention and the extracted solid and filtrate is analyzed. For each extraction 15.6 parts by weight of acetonitrile is used for 5 parts of TPN. The data and results obtained are shown in the following Table I:

TABLE I

| Example No. | Mixture composition (wt. percent) | | | First extraction | | | | | | Second extraction | | | | |
|---|---|---|---|---|---|---|---|---|---|---|---|---|---|---|
| | | | | Temp., ° C. | Cryst. (wt. percent) | | | Liq. (wt. percent) | | Temp., ° C. | Cryst. (wt. percent) | | Liq. (wt. percent) | |
| | TPN | TN | BN | | TPN | TN | BN | BN | TN | | TPN | TN | TN | TPN |
| 1 | 60 | 35 | 5 | 3 | 62.5 | 36.8 | 0.7 | 99.8 | 0.2 | 60 | 96.7 | 3.3 | 95 | 5 |
| 2 | 70 | 25 | 5 | 7 | 73.0 | 26.2 | 0.8 | 99.8 | 0.2 | 55 | 97.6 | 2.4 | 96 | 4 |
| 3 | 80 | 15 | 5 | 0 | 83.6 | 15.7 | 0.7 | 99.9 | 0.1 | 60 | 98.8 | 1.2 | 94 | 6 |
| 4 | 85 | 12 | 3 | 6 | 85.2 | 12.3 | 0.5 | 99.9 | 0.1 | 55 | 99.5 | 0.5 | 93 | 7 |
| 5 | 90 | 9 | 1 | 5 | 90.9 | 9.1 | 0.0 | 99.9 | 0.1 | 50 | 99.9 | 0.1 | 95 | 5 |

As can be seen from the above data, the first extraction was quite effective in carrying benzonitrile into the filtrate, thus removing it from the terephthalonitrile. In the second extraction, the p-toluonitrile is likewise removed, yielding a highly purified terephthalonitrile product.

EXAMPLE 6

A continuous extraction is carried out in accord with the process details set forth in the drawing. As shown there, the products of an ammoxidation reaction containing terephthalonitrile, benzonitrile, and p-toluonitrile are taken through line 10 to a continuous solid-liquid extraction unit A operated at −10° C. to 0° C. to which acetonitrile is added through line 11. The extracted solid is taken through line 12 to a vacuum filter B, the solid then going through line 13 to a second continuous solid-liquid extraction unit C operated at 55° to 60° C., and to which acetonitrile is added through line 14. The extracted solid is taken through line 15 to a vacuum filter D and the solid taken off at line 16 is essentially pure terephthalonitrile. The liquid acetonitrile containing extracted components from the first extraction is taken through line 17, is combined through line 18 with the filtrate from the vacuum filter B and is taken through line 19 to a distillation tower E. Fractional distillation removes acetonitrile overhead at 82° C., taken through line 20 for recovery and/or recycle at line 11 and/or 14. In the same tower E benzonitrile is recovered at 190° C. through line 21 and the bottoms flowing through line 22 at 220° to 250° C. are essentially pure terephthalonitrile which may be combined with that taken from line 16. The acetonitrile from the second extraction is taken through line 23, combined with the filtrate from the vacuum filter D in line 24 and the combined liquid fed through line 25 to a distillation tower F. Here acetonitrile taken as overhead at 82° C. is recovered through line 26 and recycled through line 11 and/or 14 to an extraction unit. Para-toluonitrile is recovered at 217° C. through line 27 and is recycled to the ammoxidation reactor for conversion to terephthalonitrile. The bottoms comprise essentially pure terephthalonitrile which is taken off through line 28.

Table II which follows gives numerical data for the flow lines shown in the figure for the above described process.

TABLE II

| Line | Lbs./hr. | | | |
|---|---|---|---|---|
| | TPN | TN | BN | Acetonitrile |
| 10 | 80.0 | 15.0 | 5.0 | 0 |
| 11 | 0.0 | 0.0 | 0.0 | 400 |
| 12 | 78.1 | 14.1 | 0.2 | 5 |
| 13 | 78.1 | 14.0 | <0.1 | 0 |
| 14 | 0.0 | 0.0 | 0.0 | 400 |
| 15 | 76.5 | 0.9 | 0.0 | 6 |
| 16 | 76.3 | 0.3 | 0.0 | 0 |
| 17 | 1.9 | 0.9 | 4.8 | 395 |
| 18 | 0.0 | 0.1 | 0.1 | 5 |
| 19 | 1.9 | 1.0 | 4.9 | 400 |
| 20 | 0.0 | 0.0 | 0.0 | 400 |
| 21 | 0.0 | >0.9 | 4.9 | 0 |
| 22 | 1.9 | <0.1 | 0.0 | 0 |
| 23 | 1.6 | 13.1 | <0.1 | 394 |
| 24 | 0.0 | 0.6 | 0.0 | 6 |
| 25 | 1.6 | 13.7 | <0.1 | 400 |
| 26 | 0.0 | 0.0 | 0.0 | 400 |
| 27 | 0.0 | 13.5 | <0.1 | 0 |
| 28 | 1.6 | <0.2 | 0.0 | 0 |

The invention claimed is:

1. A process for the separation of benzonitrile and p-toluonitrile from admixture with terephthalonitrile obtained by the ammoxidation of p-xylene by subjecting said mixture of terephthalonitrile containing up to 60% p-toluonitrile and up to about 10% benzonitrile to extraction with acetonitrile in an amount corresponding to a weight ratio of acetonitrile to terephthalonitrile of from about 2:1 to 15:1, first at a temperature form about −20° C. to about 10° C. whereby benzonitrile is removed, and then to a second extraction at a temperature from about 30° C. to about 80° C. whereby p-toluonitrile is removed.

2. The process of claim 1 where the first extraction is at a temperature of from about 0° to about 5° C. and the second extraction is at a temperature of from about 50° to about 60° C.

3. A process for the purification of terephthalonitrile obtained by the ammoxidation of p-xylene which comprises subjecting a mixture of terephthalonitrile containing from about 20% to about 50% p-toluonitrile and from about 0.01 to about 3% benzonitrile to a first extraction with acetonitrile in an amount corresponding to a weight ratio of acetonitrile to terephthalonitrile of from about 2:1 to 15:1 at a temperature from about −20° to about 10° C. whereby benzonitrile is removed, subjecting the extracted terephthalonitrile to a second acetonitrile extraction at a temperature of from about 30° C. to about 80° C. whereby p-toluonitrile is removed, separating p-toluonitrile and acetonitrile from the liquid extractant, recycling said p-toluonitrile to said ammoxidation reaction and recycling acetonitrile for reuse for extraction of terephthalonitrile.

4. The process of claim 3 where the first extraction is carried out at about 0° to about 5° C. and the second extraction is carried out at about 50° to about 60° C.

References Cited

UNITED STATES PATENTS

| | | | |
|---|---|---|---|
| 2,846,462 | 8/1958 | Hadley | 260—465 C |
| 3,135,795 | 6/1964 | Gasson et al. | 260—465 C |
| 3,362,982 | 1/1968 | Oga et al. | 260—465 C |
| 3,468,763 | 9/1969 | Paguch | 260—465 H X |

JOSEPH P. BRUST, Primary Examiner